J. FIEUX.
GYROSCOPIC TRANSMISSION APPARATUS.
APPLICATION FILED MAR. 18, 1911.

1,162,593.

Patented Nov. 30, 1915.
3 SHEETS—SHEET 1.

UNITED STATES PATENT OFFICE.

JEAN FIEUX, OF HARFLEUR, FRANCE.

GYROSCOPIC TRANSMISSION APPARATUS.

1,162,593.  Specification of Letters Patent.  Patented Nov. 30, 1915.

Application filed March 18, 1911. Serial No. 615,206.

*To all whom it may concern:*

Be it known that I, JEAN FIEUX, a citizen of the French Republic, residing at 19 Rue Gambetta, Harfleur, France, have invented new and useful Improvements in Gyroscopic Transmission Apparatus, of which the following is a specification.

The present invention relates to means for transmitting motion from a driving element to a driven element through the intermediary of a gyroscopic structure, utilizing the gyroscopic force thereof as a means for transmitting the motion of one element to the other.

In the present invention the various parts of the transmission apparatus including the gyroscopic structure are of improved construction of arrangement, and novel means are provided for rotating the gyroscope in its supporting frame, means also being provided for varying the inclination of the longitudinal axis of said support in relation to the axis of the driven shaft for the purposes hereinafter described.

It is one of the objects of my present invention to provide such an apparatus having an improved arrangement of mounting and supporting the gyroscope in its frame and of connecting the latter to the intermediate member or shaft to which variable oscillatory impulses are imparted by the action of the gyroscopic structure oscillating on its axis.

Another object of this invention is to provide an improved locking or connecting device for use with the apparatus whereby the driven shaft will receive in the same direction all of the impulses alternately given in the one and the other direction by the oscillatory intermediate member or shaft.

A further object of the invention is to provide the apparatus with improved means for positively driving the gyroscopic wheel and whereby its rotation may be varied for the purpose of modifying the power of transmission from the driving to the driven shaft.

Finally my invention also includes means for directly utilizing the oscillatory impulses of the intermedate member for obtaining an alternating or intermittent movement whereby the apparatus is especially adapted to certain types of machinery.

Figure 1:
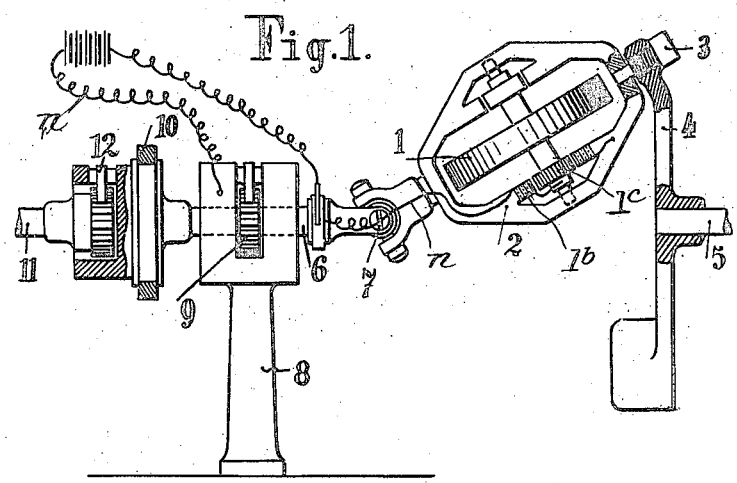
Figure 2:
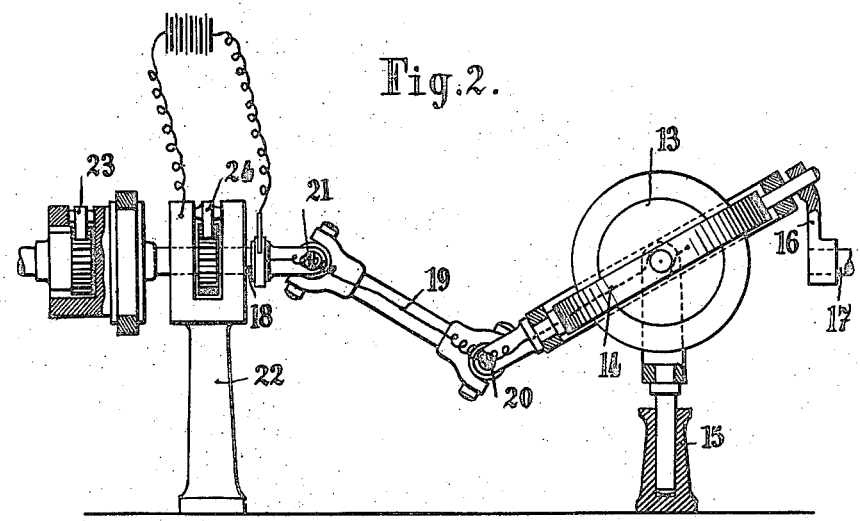
Figure 3:
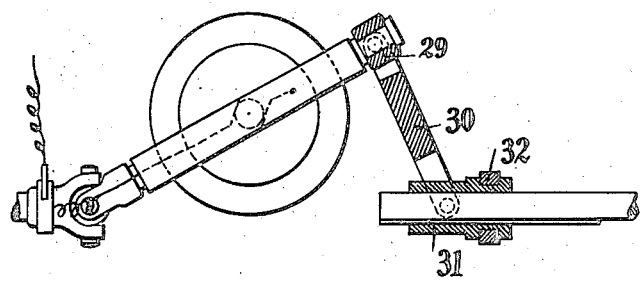
Figure 4:
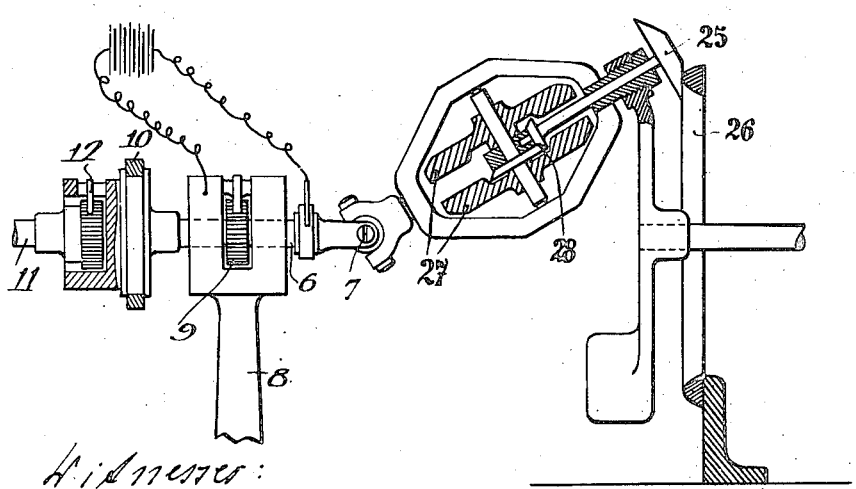
Figure 5:
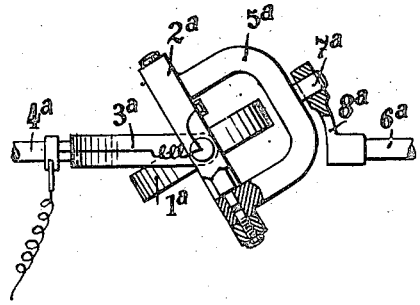
Figure 6:
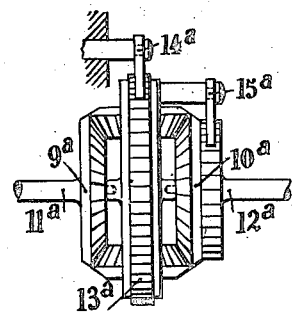
Figure 7:
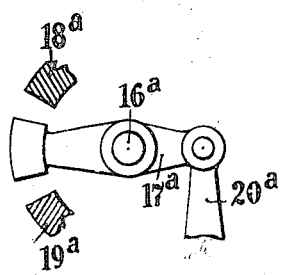
Figure 8:
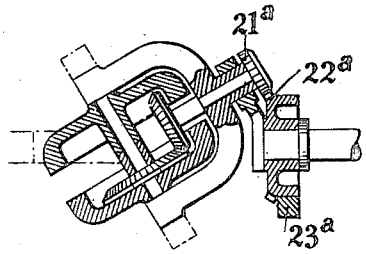

In the drawings forming a part of this specification: Figure 1 is a side elevation partly in section and discloses details of construction showing a driving and a driven element operatively connected by a gyroscopic structure embodying my invention and also disclosing electrical connections appertaining thereto diagrammatically represented. Fig. 2 is a similar view showing a modified form of my invention. Fig. 3 shows an arrangement in which the change of speed is obtained by the inclination of the axis of the frame to the axis of the driving shaft. Fig. 4 is a similar view showing a modified means for rotating the flywheel of the gyroscopic structure. Fig. 5 is a side elevation of a device similar to that shown in Fig. 2 and illustrates the improved arrangement and manner of mounting the wheel of the gyroscopic structure in its frame in relation to the driving and driven shafts, and of connecting thereto the oscillatory intermediate member. Fig. 6 shows the combination of an ordinary differential gearing and a coupling system for assuring the connection of the oscillatory intermediate shaft. Fig. 7 shows an arrangement for permitting of obtaining from the oscillatory impulses of the intermediate member an alternating or intermittent movement more particularly suitable for the control of certain parts of machines without the use of any coupling system of gear wheels. Fig. 8 shows the improved means for positively driving the gyroscopic structure and for modifying its power of transmission by modifying its speed of rotation.

In general, the invention consists of the combination of a driving element such as a shaft and a driven element such as another shaft with a gyroscopic structure being interposed and operatively connected with said elements and having the axis of rotation of the flywheel extending crosswise to the axis of the driving and driven elements. By imparting rotation to the flywheel of the gyroscopic structure and rotating the latter from the driving shaft, it is obvious that a gyroscopic force is developed providing a yieldable or flexible coupler between the driving and driven shaft.

Particularly referring to Fig. 1, 5 designates a driving shaft and 6 a driven shaft motion being imparted from one to the other through the intermediacy of a gyroscopic structure 2. This gyroscopic structure includes a frame 2' pivotally connected at one end, as at 3, to a counterbalanced crank 4 secured to the driving shaft 5, and at the other end diametrically opposite to the point of connection 3 connected by a universal joint 7 to the driven shaft 6. A flywheel 1 is carried by the frame 2' having its axis of rotation perpendicular to the axis of the connections 3 and 7. Rotation is imparted to the flywheel 1 by any suitable means for instance such as by electric conductors *p* and *n*, an armature *a* being mounted on the shaft of the flywheel 1. The armature is provided with a commutator 1ᶜ and brushes 1ᵇ in the usual well known manner and a source of electric energy G is provided in connection with the conductors *p* and *n*. The shaft 6 is carried by a suitable support 8 and is provided with a ratchet mechanism 9 to normally prevent the shaft from rotation in the wrong direction. The shaft 6 is also provided with a friction brake 10 serving to instantly stop the same, and a ratchet mechanism 12 is provided for transmitting the motion of said shaft 6 to a driven element 11.

Particularly referring to Fig. 2, a flywheel 13 and frame 14 are supported by a swivel joint 15 so that the frame 14 may receive compound oscillatory movement on account of its pivotal connection to a crank 16 secured to the driving shaft 17. At its free end opposite to the crank 16 the frame 14 is connected by a universal joint 20 to a link 19. A universal joint 21 connects this link 19 to the driven shaft 18 supported as shown at 22 and provided with ratchet mechanisms 24 and 23 corresponding to the ratchet mechanisms 9 and 12, respectively, illustrated in Fig. 1. The flywheel may be rotated by an electric motor as described in connection with Fig. 1 or any suitable well known mechanism may be used for this purpose. As shown in Fig. 4 a friction roller 25 operates on a track 26, the former transmitting its rotary motion to the flywheel 27 by means of coacting beveled rollers 28. In order to vary the transmitting power of the gyroscopic structure, the speed of rotation of the flywheel may be varied, by increasing or decreasing the electrical current through the rheostat *r* in case a motor is used, or by relative actual movement of the beveled friction roller 25 with respect to its track when such friction transmitting means is used.

Fig. 3 shows means for changing the inclination of the gyroscopic frame with respect to the axis of the driving element and in this figure, 29 is a bearing pivotally connecting the frame of the gyroscopic structure to a link 30, the latter being pivotally connected to a collar 31 longitudinally slidable on the driving shaft by a forked member 32 but rotatable therewith by its connection with said shaft.

The construction shown in Fig. 5 is similar to that shown in Fig. 2. It has the swinging center of the gyroscopic structure in substantially the center of gravity of the rotating mass, which is an advantage over the structure represented in Fig. 2 as the device shown in Fig. 5 is more condensed and of a much simpler construction. As shown in said figure the flywheel 1ᵃ rotates in a frame 2ᵃ forming one of the coacting members of a universal joint. A forked member 3ᵃ carried by a driven shaft 4ᵃ is pivoted to the frame 2ᵃ and a fork 5ᵃ pivoted at a right angle to the frame 2ᵃ receives movement of the driving shaft 6ᵃ through a crank 8ᵃ, a pivoted connection 7ᵃ being interposed between the latter and the fork 5ᵃ. A shaft 4ᵃ can be formed integral with the driven element, in which case the latter can acquire a rotary speed equal to that of the driven shaft from the action of a single impulse of the gyroscopic structure.

In the operation of the device illustrated in Fig. 1, the operation of which is typical of the other forms herein illustrated, when the gyroscopic member 1 is set in motion and the shaft 5 is rotated a precessional movement of the frame 2 will result, the frame 2 even though it is moved will remain relatively stationary with respect to the member 4, due to the function of the gyroscopic member 1. This is because of the property of the gyroscope which, if the gyroscope is rotated with sufficient speed, will maintain its own axis at right angles to the axis of the member 7, thereby forming a practically positive driving connection between the shafts 5 and 6 through the medium of the gyroscopic member and frame 2, the result is that if the shaft 5 is rotated the shaft 6 will also be driven. However if the speed of the gyroscopic member 1 is not sufficiently great then as the shaft 5 is rotated the frame 2 will tend, upon each rotation of the shaft 5, to turn through an angle of 180°, thereby changing the relative position of the frame and the gyroscopic member with respect to the member 4; which fact, will of course have the result of imparting an oscillatory movement to the shaft 6. However the ratchet coupling member, in this event, may be so adjusted as to allow the shaft 6 to rotate only in the direction desired, but not resulting in a continuous rotary movement, but in an intermittent movement.

It will be evident that any of the forms illustrated are capable of giving a continuous rotary movement, but that only from those in which the ratchet device is employed can the intermittent movement in the same direction be derived. Also it will be evident that only in those forms embodying the proper ratchet device can the oscillatory movement result, except where no ratchet device is employed and when the gyroscopic member is not rotated with sufficient speed.

The brake 10 is provided for stopping the motion of the shaft 11 after the shaft 5 has ceased to rotate.

If the mass to be put in motion is of certain importance it is necessary to employ the coupling system of the gearing described hereinbefore in connection with the device shown in Fig. 1.

What I claim is:

1. In a gyroscopic transmitting device, the combination of a driving shaft and a driven shaft with a gyroscopic structure, having a fly-wheel, an element, means for transmitting motion from said driven shaft to said element, means for transmitting rotary motion to its fly-wheel, means operatively connecting said gyroscopic structure to said driving shaft and driven shaft for transmission of motion, one to the other, through the gyroscopic force obtained thereby, and means adapted to resist the rotation of the driven shaft whereby the driving shaft may rotate independently of the driven shaft and automatically transmit motion to said driven shaft upon the release of said rotation resisting means.

2. In a gyroscopic transmitting device, the combination of a driving shaft and a driven shaft with a gyroscopic structure having a fly-wheel, an element, a ratchet mechanism adapted to transmit motion from said driven shaft to said element, means for transmitting rotary motion to said flywheel, means operatively connecting said gyroscopic structure to said driving shaft and driven shaft for transmission of motion, one to the other, through the gyroscopic force obtained thereby, and a brake device for said driven shaft and adapted to resist rotation thereof, whereby the driving shaft may rotate independently of the driven shaft, and automatically transmit motion upon release of said brake device to said driven shaft.

3. In a gyroscopic transmitting device, the combination of a driving shaft and a driven shaft with a gyroscopic structure having a fly-wheel, an element, a ratchet mechanism adapted to transmit motion from said driven shaft to said element, a friction roller operating on a track, bevel gears upon one end of its axis meshing with a bevel gear of the fly-wheel, for transmitting rotary motion to said fly-wheel, a crank and universal joint connection for operatively connecting said gyroscopic structure to said driving shaft and driven shaft for transmission of motion, one to the other through the gyroscopic force obtained thereby, and a brake device for said driven shaft adapted to resist rotation thereof, whereby the driving shaft may rotate independently of the driven shaft, and automatically transmit motion upon release of said brake device to said driven shaft.

In witness whereof I have hereunto set my hand in presence of two witnesses.

JEAN FIEUX.

Witnesses:
 JOHN PRESTON BEECHER,
 CONSTANT GUÉRARD.